(12) United States Patent
Mustafa et al.

(10) Patent No.: US 12,398,808 B2
(45) Date of Patent: Aug. 26, 2025

(54) HIGH CONDUCTANCE VARIABLE ORIFICE VALVE

(71) Applicant: Applied Materials, Inc., Santa Clara, CA (US)

(72) Inventors: Muhannad Mustafa, Milpitas, CA (US); Sanjeev Baluja, Campbell, CA (US)

(73) Assignee: Applied Materials, Inc., Santa Clara, CA (US)

( * ) Notice: Subject to any disclaimer, the term of this patent is extended or adjusted under 35 U.S.C. 154(b) by 125 days.

(21) Appl. No.: 18/368,144

(22) Filed: Sep. 14, 2023

(65) Prior Publication Data

US 2025/0092953 A1  Mar. 20, 2025

(51) Int. Cl.
*F16K 1/54* (2006.01)
*F16K 1/38* (2006.01)
*F16K 13/00* (2006.01)

(52) U.S. Cl.
CPC .......... *F16K 1/54* (2013.01); *F16K 1/38* (2013.01); *F16K 13/00* (2013.01)

(58) Field of Classification Search
CPC ..... F16K 1/54; F16K 1/38; F16K 1/12; F16K 13/00; F16K 31/53; F16K 41/10
USPC ............... 251/249, 335.3, 333, 248
See application file for complete search history.

(56) References Cited

U.S. PATENT DOCUMENTS

| | | | |
|---|---|---|---|
| 2,376,383 A * | 5/1945 | Richards | F02C 7/22 137/460 |
| 4,240,610 A * | 12/1980 | Trimble | F16K 41/10 277/636 |
| 4,341,090 A | 7/1982 | Ramakrishnan | |
| 4,583,710 A | 4/1986 | Adams et al. | |
| 4,948,091 A * | 8/1990 | Satoh | F16K 31/082 251/129.21 |
| 5,067,389 A | 11/1991 | St. Germain | |
| 5,277,664 A | 1/1994 | Mott | |
| 6,378,841 B1 | 4/2002 | Russell | |
| 8,950,201 B2 | 2/2015 | Voorhis | |
| 2016/0273660 A1* | 9/2016 | Choi | F16K 31/53 |
| 2020/0018416 A1 | 1/2020 | Yokoe | |

(Continued)

FOREIGN PATENT DOCUMENTS

| KR | 20100000725 | 1/2010 |
|---|---|---|
| WO | 2012134949 A2 | 10/2012 |

OTHER PUBLICATIONS

PCT International Search Report and Written Opinion in PCT/US2024/046528 dated Dec. 24, 2024, 9 pages.

*Primary Examiner* — Craig M Schneider
*Assistant Examiner* — Andrew J Rost
(74) *Attorney, Agent, or Firm* — SERVILLA WHITNEY LLC (57) ABSTRACT

Variable orifice valves comprising a first fixed plate, a second fixed plate and a movable plate between are described. The movable plate is connected to the first fixed plate and the second fixed plate by sealing elements. The movable plate is moved closer to or further from the first fixed plate by rotation of an actuator ring that rotates at least two rotary elements connected to the movable plate. A needle on the movable plate engages an opening in the valve to seal or open the valve to allow fluid flow. Methods of controlling flow of fluid through the variable orifice valve are also described.

20 Claims, 5 Drawing Sheets

(56) References Cited

U.S. PATENT DOCUMENTS

2021/0139349 A1\* 5/2021 Pohjola ................ F16K 15/063
2022/0049788 A1\* 2/2022 Lin ...................... F16K 15/063

\* cited by examiner

HIGH CONDUCTANCE VARIABLE ORIFICE VALVE

TECHNICAL FIELD

Embodiments of the disclosure generally relate to apparatus for controlling gas pressure or flow rate. In particular, embodiments of the disclosure relate to variable orifice valves that can operate at a wide conductance range and/or higher temperatures.

BACKGROUND

Semiconductor manufacturing using many low-pressure processes in specially designed processing chambers. These processing chambers are frequently subjected to pumping and purging processes to maintain suitable processing conditions. During formation of electronic devices using, for example, chemical vapor deposition (CVD) or atomic layer deposition (ALD) processes, the process chamber gas flow rate is controlled to meet the deposition and/or purge requirements of the process.

In ALD/CVD processes, gas flow rates can be varied with varying valve conductance. With the changing of the gas flow rate, for example, precursor delivery (concentration), purge flow rate (dilution), processes can be optimized in terms of film thickness and uniformity. Currently available variable orifice valves are limited to low conductance ranges and cannot be operated at high temperatures, limiting the usefulness of these valves in the deposition processes.

Accordingly, there is a need for apparatus and methods to provide a wide operating range of gas conductance at high temperatures.

SUMMARY

One or more embodiments of the disclosure are directed to variable orifice valves including: a first fixed plate, a second fixed plate, a movable plate, a first sealing element, a second sealing element, and an actuator ring. The first fixed plate is located at a first end of the valve. The first fixed plate has a first side and a second side defining a first fixed plate thickness. The first fixed plate has an opening extending through the first fixed plate thickness.

A second fixed plate is at a second end of the valve. The second fixed plate has a first side and a second side defining a second fixed plate thickness. The second fixed plate has an opening extending through the second fixed plate thickness. The first side of the second fixed plate faces and is spaced from the second side of the first fixed plate.

The movable plate is positioned between the first fixed plate and the second fixed plate. The movable plate has a first side and a second side defining a movable plate thickness. The first side of the movable plate faces the second side of the first fixed plate and the second side of the movable plate faces the first side of the second fixed plate.

The movable plate has a needle extending from the first side of the movable plate. The needle has a needle end sized to fit within the opening in the first fixed plate. The movable plate has at least one opening extending through the movable plate thickness adjacent to the needle.

The first sealing element is between the first fixed plate and the movable plate. The second sealing element is between the second fixed plate and the movable plate. The actuator ring is adjacent to the first fixed plate.

The actuator ring has a plurality of inwardly directed engagement elements on an inside surface thereof. At least two rotary elements are within the actuator ring. Each of the rotary elements has a plurality of outwardly directed engagement elements on an outside surface thereof. Each of the outwardly directed engagement elements is configured to cooperatively interact with the inwardly directed engagement elements of the actuator ring. At least one connector is between the first fixed plate and the movable plate. The at least one connector is configured to move the movable plate upon rotation of the actuator ring.

Additional embodiments of the disclosure are directed to variable orifice valves including: a first fixed plate, a second fixed plate, a movable plate, a first sealing element, a second sealing element, an actuator ring, a first conduit and a second conduit. The first fixed plate is located at a first end of the valve. The first fixed plate has a first side and a second side defining a first fixed plate thickness. The first fixed plate has an opening extending through the first fixed plate thickness.

The second fixed plate is located at a second end of the valve. The second fixed plate has a first side and a second side defining a second fixed plate thickness. The second fixed plate has an opening extending through the second fixed plate thickness. The first side of the second fixed plate faces and is spaced from the second side of the first fixed plate.

The movable plate is positioned between the first fixed plate and the second fixed plate. The movable plate has a first side and a second side defining a movable plate thickness. The first side of the movable plate faces the second side of the first fixed plate and the second side of the movable plate faces the first side of the second fixed plate. The movable plate has a needle extending from the first side of the movable plate. The needle has a needle end sized to fit within the opening in the first fixed plate. The movable plate has at least one opening extending through the movable plate thickness adjacent to the needle. The needle end has a conical shape with a maximum width sized to contact the second side of the first fixed plate at the opening to form a seal.

The first sealing element is between the first fixed plate and the movable plate. The first sealing element includes a bellows. The second sealing element is between the second fixed plate and the movable plate. The second sealing element includes a bellows.

The actuator ring is adjacent to the first fixed plate. The actuator ring has a plurality of inwardly directed engagement elements on an inside surface thereof. At least three rotary elements are within the actuator ring. Each of the rotary elements has a plurality of outwardly directed engagement elements on an outside surface thereof. Each of the outwardly directed engagement elements are configured to cooperatively interact with the inwardly directed engagement elements of the actuator ring. At least one connector is between the first fixed plate and the movable plate. The at least one connector is configured to move the movable plate upon rotation of the actuator ring.

The first conduit extends from the first side of the first fixed plate. The first conduit has a threaded end and outwardly facing engagement elements configured to cooperatively interact with the outwardly directed engagement elements of the at least three rotary elements. The second conduit extends from the second side of the second fixed plate. The second conduit has a threaded end.

Movement of the actuator ring around a central axis causes each of the rotary elements to rotate around a rotary element axis while remaining in a fixed location relative to the first conduit.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

As used in this specification and the appended claims, the term "substrate" refers to a surface, or portion of a surface, upon which a process acts. It will also be understood by those skilled in the art that reference to a substrate can also refer to only a portion of the substrate, unless the context clearly indicates otherwise. Additionally, reference to depositing on a substrate can mean both a bare substrate and a substrate with one or more films or features deposited or formed thereon.

Embodiments of the disclosure are directed to variable orifice valves that can be manually or automatedly operated that allow for a wide range of gas conductance and can operate at high temperatures. Some embodiments operate at temperatures greater than or equal to 50 ºC, 100 ºC, 150 ºC, 200 ºC, 250 ºC, or 300 ºC for periods greater than or equal to 1 hour, 2 hours, 3 hours, 4 hours or 5 hours.

One or more embodiments of the variable orifice valve comprises a bellows with moving datum plate (also referred to as a movable plate). The movable plate can be operated by movement of a circular dial with screw (or similar) connections. A needle on the movable plate is moved towards fixed datum plate (also referred to as a fixed plate) by actuation of the dial. The dial of some embodiments acts as an annular gear assembly and internally threaded to operate multiple screws at the same time. The bellows allows for the flexibility of the moving plate to vary the valve conductance without system leakage. In some embodiments, the dial is manually or automatically controlled using a motor. The valve conductance can be varied using a wide range of openings designed as required for a particular process.

Some embodiments of the disclosure advantageously provide variable orifice valves that are compact and require less space for installation than current valves. Some embodiments can be operated at a wide temperature range. Some embodiments provide valve conductance that can be optimized over a wide range as required by particular process conditions. Some embodiments are advantageously easy to operate compared to available need valves using dial rotation to actuate the valve.

With reference to the Figures, one or more embodiments of the disclosure is directed to a variable orifice valve 100. The variable orifice valve 100 has a first end 101 and a second end 102 which can be inserted into a gas flow path to control the flow conductance.

The variable orifice valve 100 comprises a first fixed plate 120, a second fixed plate 140 and a movable plate 160. The movable plate 160 is positioned between the first fixed plate 120 and the second fixed plate 140.

The first fixed plate 120 is located at or adjacent to the first end 101 of the variable orifice valve 100. The first fixed plate 120 has a first side 122 and second side 124 that define a first fixed plate thickness $T_{F1}$. The first fixed plate thickness $T_{F1}$ can be any suitable thickness including, but not limited to, a thickness in the range of 0.5 mm to 50 mm, or in the range of 1 mm to 10 mm, or in the range of 2 mm to 5 mm.

The first fixed plate 120 has an opening 126 extending through the first fixed plate thickness $T_{F1}$. The opening 126 in the first fixed plate 120 can be any suitable diameter depending on the target conductance of the gas flowing through the variable orifice valve 100. In some embodiments, the opening 126 has a diameter in the range of 0.25 inches to 5 inches, or in the range of 0.5 inches to 4 inches, or in the range of 1 inch to 2 inches.

The second fixed plate 140 is located at or adjacent to the second end 102 of the variable orifice valve 100. The second fixed plate 140 has a first side 142 and second side 144 that define a second fixed plate thickness $T_{F2}$. The first side 142 of the second fixed plate 140 faces the second side 124 of the first fixed plate 120. The second fixed plate thickness $T_{F2}$ can be any suitable thickness including, but not limited to, a thickness in the range of 0.5 mm to 50 mm, or in the range of 1 mm to 10 mm, or in the range of 2 mm to 5 mm.

The second fixed plate 140 has an opening 146 extending through the second fixed plate thickness $T_{F2}$. The opening 146 in the second fixed plate 140 can be any suitable diameter depending on the target conductance of the gas flowing through the variable orifice valve 100. In some embodiments, the opening 146 has a diameter in the range of 0.25 inches to 5 inches, or in the range of 0.5 inches to 4 inches, or in the range of 1 inch to 2 inches.

Figure 1:
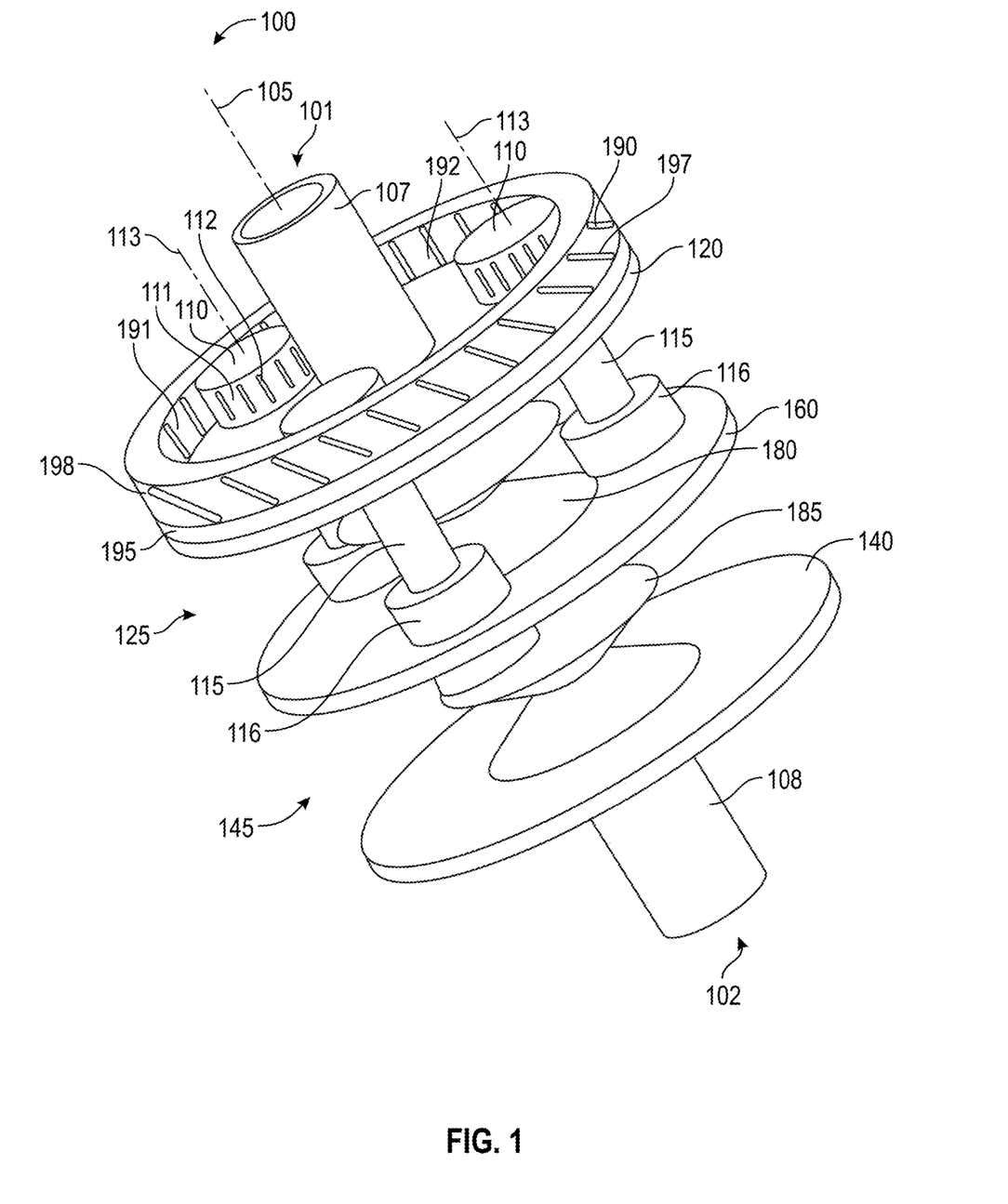
FIG. 1 shows a variable orifice valve according to one or more embodiment of the disclosure.
Figure 2:
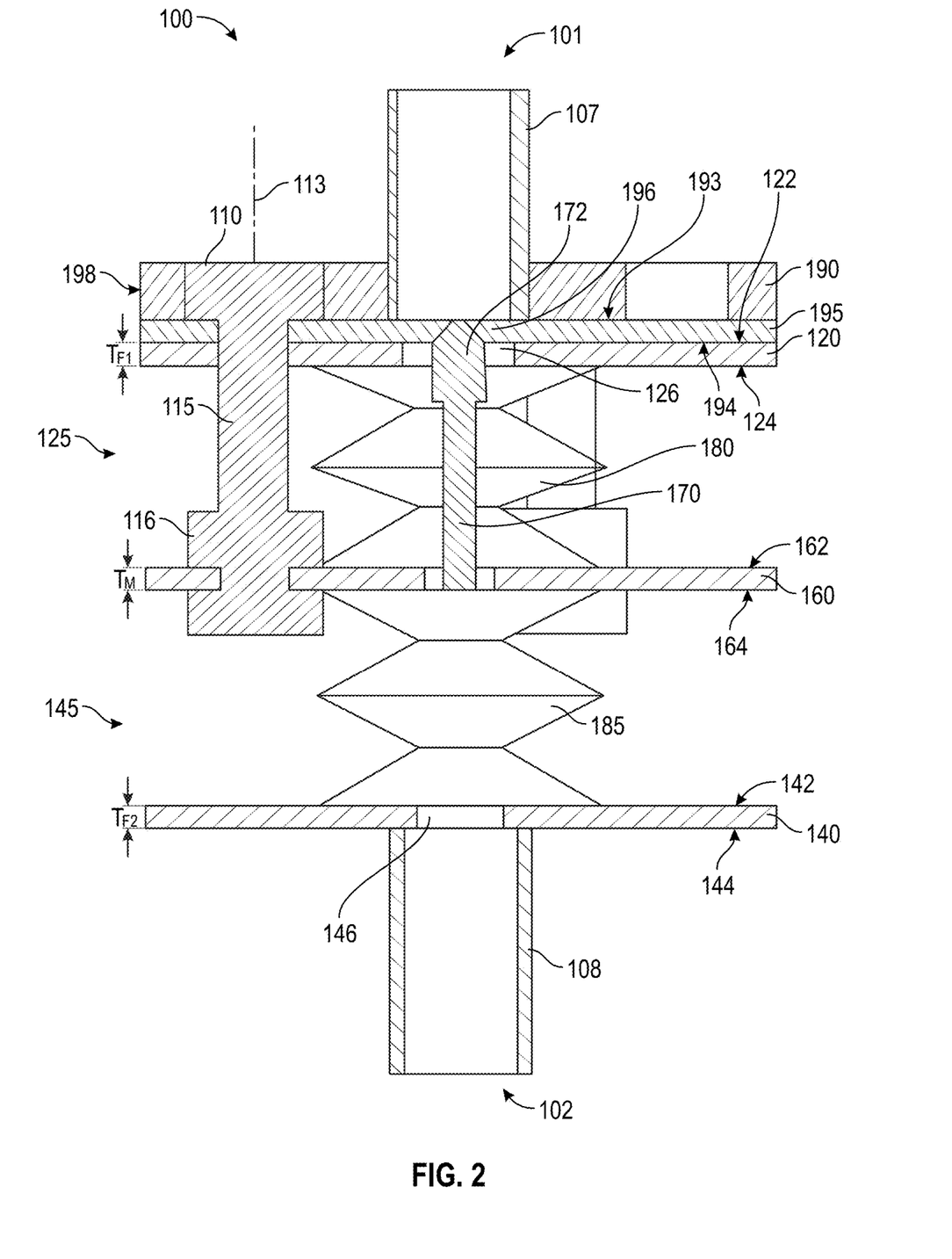
FIG. 2 shows a cross-sectional view of variable orifice valve according to one or more embodiment of the disclosure.
Figure 3:
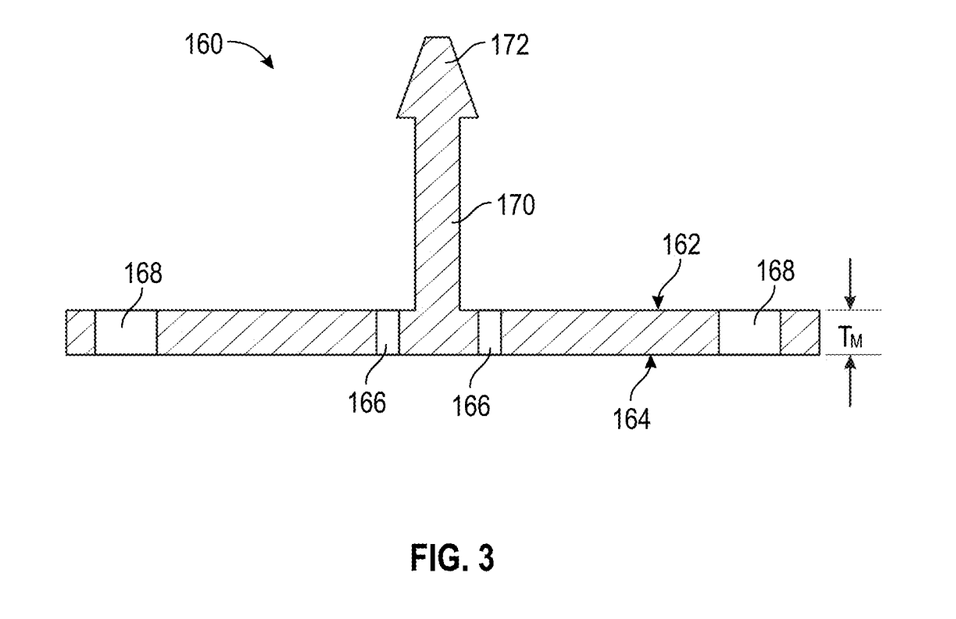
FIG. 3 shows a schematic cross-sectional view of a movable plate for use with a variable orifice valve according to one or more embodiment of the disclosure.

With reference to FIGS. 1 through 3, the movable plate 160 is positioned between the first fixed plate 120 and the second fixed plate 140. The movable plate has a first side 162 and a second side 164 defining a movable plate thickness $T_M$. The first side 162 of the movable plate 160 faces the second side 124 of the first fixed plate 120 and the second side 164 of the movable plate 160 faces the first side 142 of the second fixed plate 140. The movable plate 160 is positioned so that there is a gap 125 between the first side 162 of the movable plate 160 and the second side 124 of the first fixed plate 120, and there is a gap 145 between the second side 164 of the movable plate 160 and the first side 142 of the second fixed plate 140.

The movable plate 160 has a needle 170 extending from the first side 162 of the movable plate 160. The needle has a needle end 172 sized to fit within the opening 126 in the first fixed plate 120. The movable plate 160 has at least one opening 166 extending through the movable plate thickness $T_M$ adjacent the needle 170. The at least one opening 166 adjacent the needle 170 allows for a flow of fluid (e.g., a gas or liquid) to pass through the movable plate 160. There can be any suitable number of openings 166. For example, in some embodiments, there are four, five, six, seven, eight, nine, ten, eleven or twelve openings 166.

A first sealing element 180 is located between the first fixed plate 120 and the movable plate 160. The first sealing element 180 creates a fluid tight seal between the first fixed plate 120 and the movable plate 160 during movement of the movable plate 160 closer to or further from the first fixed plate 120. The first sealing element 180 can be any suitable component known to the skilled artisan that can form a fluid-tight seal. In some embodiments, the first sealing element 180 comprises a bellows.

A second sealing element 185 is located between the second fixed plate 140 and the movable plate 160. The second sealing element 185 creates a fluid tight seal between the movable plate 160 and the second fixed plate 140 during movement of the movable plate 160 closer to or further from the second fixed plate 140. The second sealing element 185 can be any suitable component known to the skilled artisan that can form a fluid-tight seal. In some embodiments, the second sealing element 185 comprises a bellows.

In some embodiments, as shown in the Figures, the movable plate 160 further comprises at least one outer opening 168. The at least one outer opening 168 is located in the outer portion of the movable plate 160 and is outside of the first sealing element 180 and the second sealing element 185.

In some embodiments, the first sealing element 180 and/or the second sealing element 185 comprise a high temperature material. In some embodiments, the first sealing element 180 and/or the second sealing element 185 comprise bellows made of, or lined with, a high temperature material.

The variable orifice valve 100 further comprises an actuator ring 190 located adjacent to the first fixed plate 120. The actuator ring 190 of some embodiments has a plurality of inwardly directed engagement elements 192 on an inside surface 191 thereof. The plurality of inwardly directed engagement elements 192 of some embodiments are gear teeth.

At least two rotary elements 110 are located within the actuator ring 190. Each of the at least two rotary elements 110 has a plurality of outwardly directed engagement elements 112 on an outside surface 111 thereof. Each of the plurality of outwardly directed engagement elements 112 are configured to cooperatively interact with the plurality of inwardly directed engagement elements 192 of the actuator ring 190. For example, in some embodiments, the plurality of inwardly directed engagement elements 192 of the actuator ring 190 are gear teeth and the plurality of outwardly directed engagement elements 112 of the at least two rotary elements 110 are complementary gear teeth configured to mesh with the gear teeth of the actuator ring 190.

In use, movement of the actuator ring 190 around a central axis 105 causes the plurality of inwardly directed engagement elements 192 to rotate around the central axis 105. The plurality of inwardly directed engagement elements 192 meshing with the plurality of outwardly directed engagement elements 112 of the at least two rotary elements 110 results in rotation of each of the at least two rotary elements 110 around a rotary element axis 113.

Figure 6A:
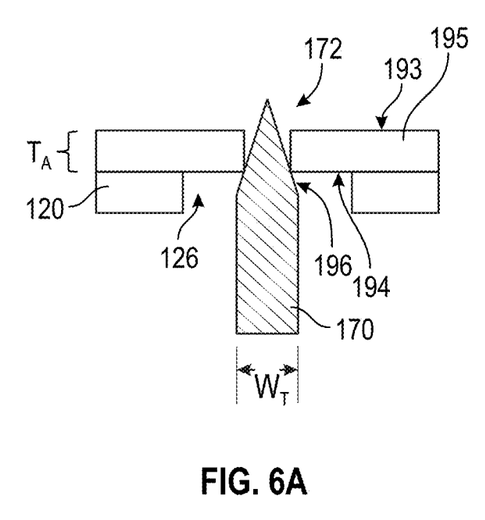
FIG. 6A shows a portion of a schematic cross-sectional view of a needle engaging an actuator plate fully sealing a variable orifice valve according to one or more embodiment of the disclosure.

In some embodiments, the at least two rotary elements 110 are positioned on an actuator plate 195. The actuator plate 195 has a first side 193 and a second side 194 defining a thickness $T_A$ of the actuator plate 195, as shown in FIG. 6A. The actuator plate 195 of some embodiments keeps the at least two rotary elements 110 stationary so that the rotary element axis 113 of each at least two rotary elements 110 remains in a fixed location relative to the first conduit. Stated differently, in some embodiments, the actuator plate 195 keeps the at least two rotary elements 110 in a fixed location relative to the central axis 105, without rotating around the central axis 105.

The variable orifice valve 100 can have any suitable number of rotary elements 110. For example, the drawings illustrate variable orifice valve 100 with three rotary elements 110. In some embodiments, there are two, three, four, five, or six rotary elements 110 arranged symmetrically around the central axis 105 of the variable orifice valve 100.

Actuation of the actuator ring 190 causes rotation of the at least two rotary elements 110 around the rotary element axis 113. This rotary movement is translated into movement of the movable plate 160 by at least one connector 115 between the first fixed plate 120 and the movable plate 160. The at least one connector 115 is configured to move the movable plate 160 upon rotation of the actuator ring 190. The at least one connector 115 can be connected to the movable plate 160 by any suitable connection known to the skilled artisan. For example, as shown in the Figures, the at least one connector 115 comprises a threaded rod connected to the movable plate 160 by a pair of nuts or through a threaded opening in the movable plate 160. Rotation of the at least two rotary elements 110 causes rotation of the at least one connector 115 around the rotary element axis 113 and movement of the movable plate 160 by interaction of the at least one connector 115 with the movable plate connector 116. In some embodiments, the movable plate connector 116 comprises one or more nut with threads configured to complement threads on the at least one connector 115. In some embodiments, the movable plate connector 116 comprises an opening in the movable plate 160 having an internally threaded surface.

The variable orifice valve 100 of some embodiments further comprises one or more of a first conduit 107 extending from first side 122 of the first fixed plate 120, or a second conduit 108 extending from the second side 144 of the second fixed plate 140. The first conduit 107 and/or second conduit 108 of some embodiments comprises a suitable connector configured to attach the variable orifice valve 100 to a flow path. Suitable connectors include, but are not limited to, screw threads, compression fittings, direct soldering to the tube, direct lock fittings, and push-connect fittings (e.g., Shark Bite style fittings). In some embodiments, each of the first conduit 107 and the second conduit 108 is configured to be connected to and form a fluid tight seal with a gas line.

Figure 4:
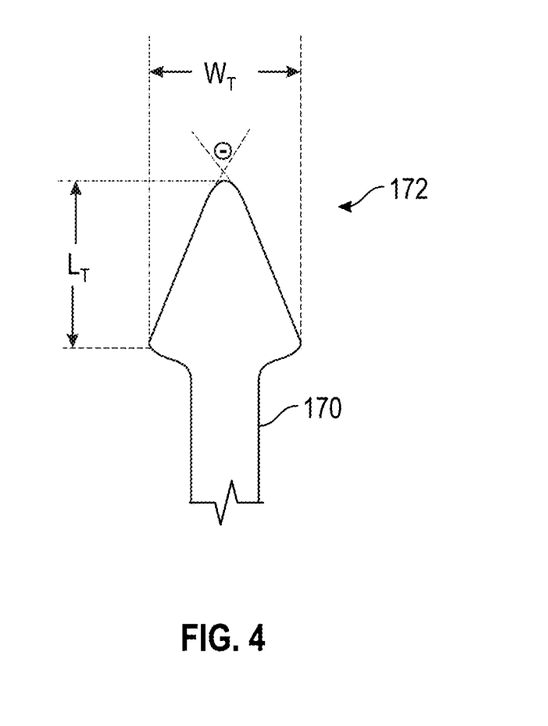
FIG. 4 shows a portion of a needle end of a needle that is attached to a movable plate according to one or more embodiment of the disclosure.

In some embodiments, as shown in FIG. 4, one or more of the first conduit 107 comprises outwardly facing engagement elements 109 configured to cooperatively interact with the outwardly directed engagement elements 112 of the at least two rotary elements 110. The engagement elements 109 of some embodiments provides resistance to lateral movement of the at least two rotary elements 110 so that the plurality of outwardly directed engagement elements 112 on the outside surface 111 of the at least two rotary elements 110 remains in contact with the plurality of inwardly directed engagement elements 192 on the inside surface 191 of the actuator ring 190.

Figure 6B:
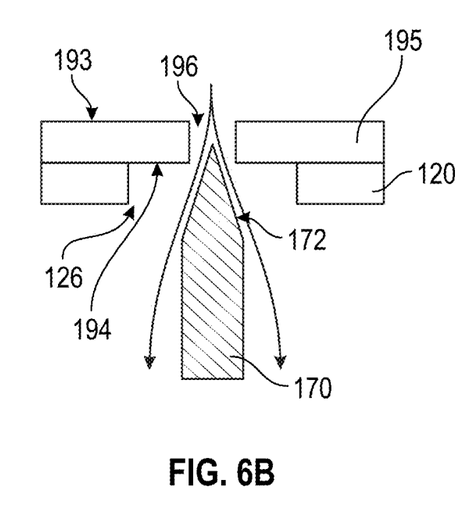
FIG. 6B shows a portion of a schematic cross-sectional view of a needle disengaged from the actuator plate fully opening a variable orifice valve according to one or more embodiment of the disclosure.

Referring to FIGS. 3, 4 and 6, in some embodiments, the needle end 172 of the needle 170 is shaped to cooperatively interact with the opening 126 in the first fixed plate 120. In some embodiments, the opening 126 of the first fixed plate 120 is sized larger than the needle end 172 so that the entire needle end 172 fits through the 126 without contacting the sides of the opening 126, as illustrated in FIG. 2. In embodiments of this sort, the actuator plate 195 has an opening 196 with a maximum diameter that is smaller than the maximum width $W_T$ of the needle end 172. In some embodiments, the maximum width $W_T$ of the needle end 172 is sized to contact the second side 124 of the first fixed plate 120 at the opening 126 through the first fixed plate 120 to form a seal.

As shown in FIGS. 6A and 6B, in some embodiments, the opening 126 of the first fixed plate 120 is larger than the width $W_T$ of the needle end 172 so that actuation of the movable plate 160 causes the needle end 172 to pass through the opening 126 in the first fixed plate 120 without contacting the first fixed plate 120. The needle end 172 of embodiments of this sort contact the second side 194 of the actuator ring 190 while passing through the opening 196 in the actuator plate 195 to form a fluid-tight seal. In embodiments where the opening 126 of the first fixed plate 120 is greater than the width $W_T$ of the needle end 172, the variable orifice valve 100 conductance can be tuned by replacing the actuator plate 195 with an actuator plate 195 with a different diameter opening 196.

In use, the needle 170 attached to the movable plate 160 can be moved between a fully opened, see FIG. 6B, and a fully sealed, see FIG. 6A, position. This full actuation is referred to as the stroke of the valve. In the embodiment shown, when fully sealed, a portion of the surface of the needle end 172 contacts the second side 194 of the actuator ring 190 actuator plate 195. Specifically, the needle end 172 contacts the second side 194 at the opening 196. When the variable orifice valve 100 is opened, the needle 170 backs away from the second side 194 of the actuator plate 195 allowing fluid (e.g., gas) to flow through the opening 196. The further the needle 170 retracts from the actuator plate 195, the greater the flow conductance through the variable orifice valve 100.

In some embodiments, the needle end 172 is conically shaped. The conical shaped needle end 172 can have a sharp end, as shown in FIGS. 6A and 6B, or can have a frusto-conical end as shown in FIG. 3, or a rounded conical end, as shown in FIG. 4. Needle ends 172 having other shapes can also be used without deviating from the scope of the disclosure.

In some embodiments, the needle end 172 has a conical shape with a linear taper, as shown in FIGS. 3, 4, 6A and 6B.

The linear taper can have a truncated, rounded, or sharp end. The angle $\Theta$ of the taper of the needle end 172 can be any suitable angle and can affect the conductance of the variable orifice valve 100. For example, a smaller angle results in a sharper shaped needle end 172 which can provide a longer stroke between a fully opened and sealed valve. Additionally, the sharpness of the needle end 172 can affect the overall conductance of the valve by changing the flow resistance through the valve 100.

Figure 7A:
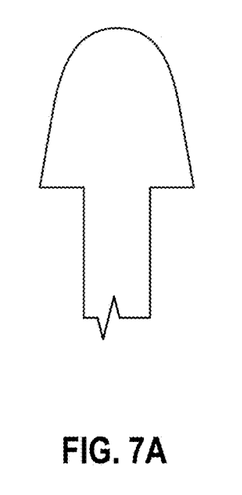
FIG. 7A shows a portion of a needle with a convex needle end according to one or more embodiment of the disclosure.
Figure 7B:
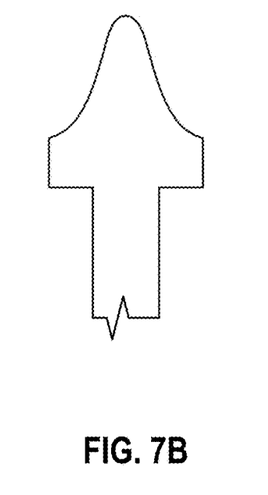
FIG. 7B shows a portion of a needle with a convex end according to one or more embodiment of the disclosure.

In some embodiments, the needle end 172 has a non-linear taper. For example, the embodiment illustrated in FIG. 7A has a convex taper and the embodiment illustrated in FIG. 7B has a concave taper. The skilled artisan will understand the relationship between the shape of the needle end 172 and the stroke length between fully opened and a fully closed valve.

Figure 5:
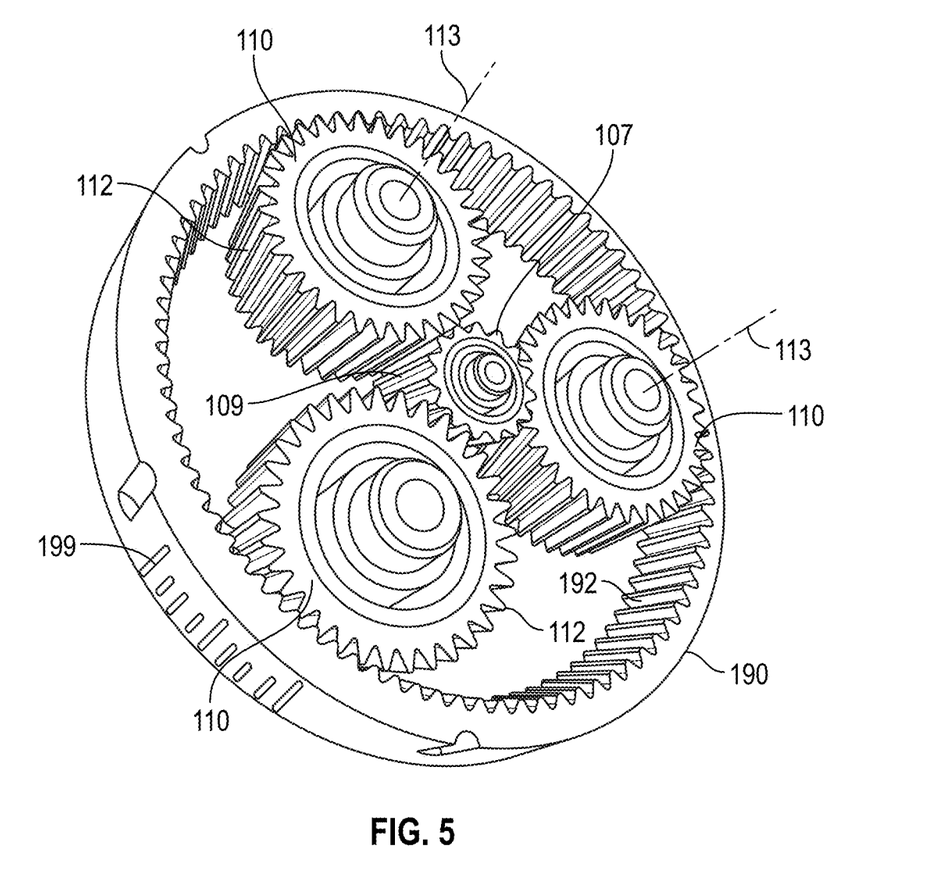
FIG. 5 shows a perspective view of an actuator ring with three rotary elements and indicia according to one or more embodiment of the disclosure.

In some embodiments, the actuator ring 190 has knurling 197 on the outside surface 198, as shown in FIG. 1. The knurling 197 can be any suitable pattern or configuration to provide a better grip for the user to rotate the actuator ring 190. In some embodiments, as shown in FIG. 5, the actuator ring 190 has marking indicia 199 on the outside surface 198 or top surface (first side 193) thereof. The marking indicia 199 of some embodiments indicates an amount that the valve 100 is open during rotation of the actuator ring 190.

Figure 8:
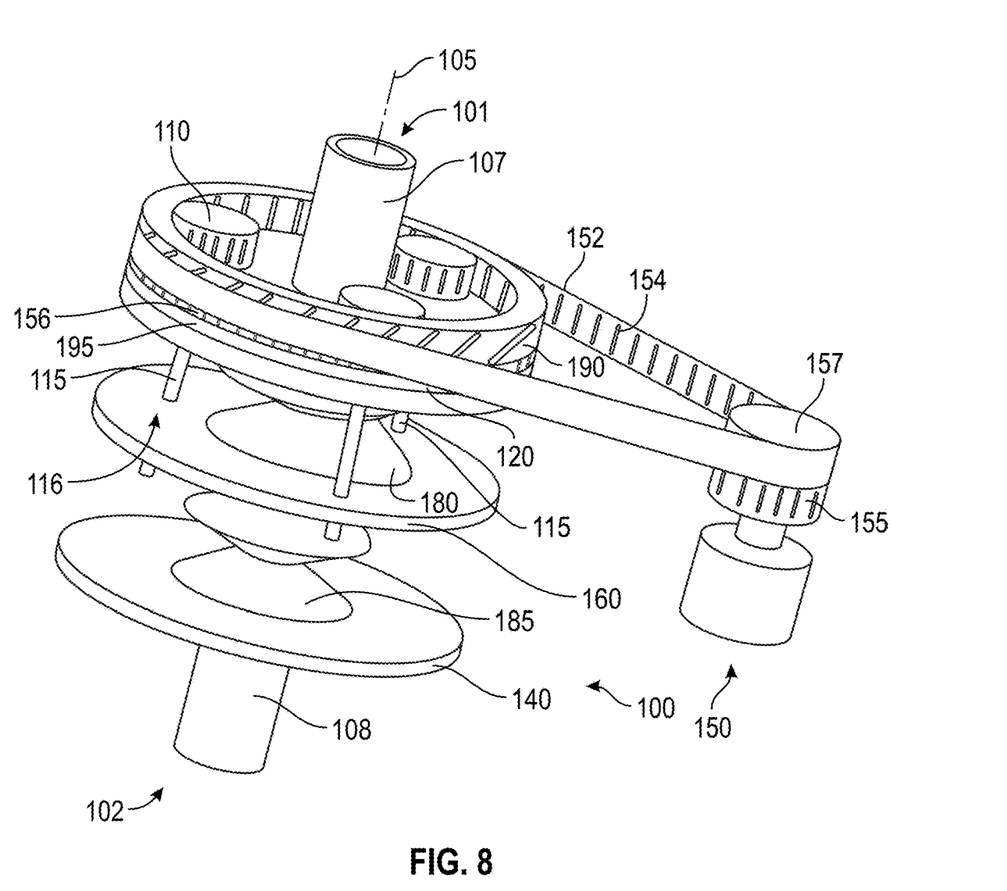
FIG. 8 shows a motor driven variable orifice valve according to one or more embodiment of the disclosure.

FIG. 8 shows an embodiment of the variable orifice valve 100 that is motorized. The embodiment shown comprises a motor 150 that is configured to rotate the actuator ring 190 to rotate the actuator ring 190 around the central axis 105. The motor 150 can be any suitable motor known to the skilled artisan that will provide sufficient control of the actuator ring 190 and the variable orifice valve 100. For example, a stepper motor or servo motor can be used.

The motor 150 illustrated in FIG. 8 is connected to the actuator ring 190 using a belt 152 driven by the motor 150. The belt 152 can be any suitable belt known to the skilled artisan for this purposes. In some embodiments, the belt 152 comprises inwardly facing engagement elements 154 that are configured to cooperatively interact with outwardly facing engagement elements 156 on the actuator ring 190 and outwardly facing engagement elements 155 on the motor pulley 157. In some embodiments, the belt 152 can be a v-belt that interacts with a complementary groove in the actuator ring 190.

In some embodiments, the motor 150 is connected to the actuator ring 190 directly, without use of a belt-drive system. In embodiments of this sort, the motor is configured to directly interact with the outwardly facing engagement elements 156 of the actuator ring 190.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, those skilled in the art will understand that the embodiments described are merely illustrative of the principles and applications of the present disclosure. It will be apparent to those skilled in the art that various modifications and variations can be made to the method and apparatus of the present disclosure without departing from the spirit and scope of the disclosure. Thus, the present disclosure can include modifications and variations that are within the scope of the appended claims and their equivalents.

What is claimed is:

1. A variable orifice valve comprising:
a first fixed plate at a first end of the variable orifice valve, the first fixed plate having a first side and a second side defining a first fixed plate thickness, the first fixed plate having an opening extending through the first fixed plate thickness;
a second fixed plate at a second end of the variable orifice valve, the second fixed plate having a first side and a second side defining a second fixed plate thickness, the second fixed plate having an opening extending through the second fixed plate thickness, the first side of the second fixed plate facing and spaced from the second side of the first fixed plate;
a movable plate positioned between the first fixed plate and the second fixed plate, the movable plate having a first side and a second side defining a movable plate thickness, the first side of the movable plate facing the second side of the first fixed plate and the second side of the movable plate facing the first side of the second fixed plate, the movable plate having a needle extending from the first side of the movable plate, the needle having a needle end sized to fit within the opening in the first fixed plate, the movable plate having at least one opening extending through the movable plate thickness adjacent the needle;
a first sealing element between the first fixed plate and the movable plate;
a second sealing element between the second fixed plate and the movable plate;
an actuator ring adjacent the first fixed plate, the actuator ring having a plurality of inwardly directed engagement elements on an inside surface thereof;
at least two rotary elements within the actuator ring, each of the rotary elements having a plurality of outwardly directed engagement elements on an outside surface thereof, each of the outwardly directed engagement elements configured to cooperatively interact with the inwardly directed engagement elements of the actuator ring; and
at least one connector between the first fixed plate and the movable plate, the at least one connector configured to move the movable plate upon rotation of the actuator ring.

2. The variable orifice valve of claim 1, further comprising a first conduit extending from the first side of the first fixed plate.

3. The variable orifice valve of claim 2, further comprising a second conduit extending from the second side of the second fixed plate.

4. The variable orifice valve of claim 3, wherein each of the first conduit and the second conduit is configured to be connected to and form a fluid tight seal with a gas line.

5. The variable orifice valve of claim 2, wherein the first conduit comprising outwardly facing engagement elements configured to cooperatively interact with the outwardly directed engagement elements of the rotary elements.

6. The variable orifice valve of claim 5, wherein there are three or more rotary elements arranged symmetrically around the first conduit.

7. The variable orifice valve of claim 6, wherein movement of the actuator ring around a central axis causes each of the rotary elements to rotate around a rotary element axis while remaining in a fixed location relative to the first conduit.

8. The variable orifice valve of claim 7, wherein rotation of each rotary element causes a connector to rotate, the connector rotation causing movement of the movable plate.

9. The variable orifice valve of claim 1, wherein each of the first sealing element and the second sealing element comprises a bellows.

10. The variable orifice valve of claim 9, wherein the bellows comprise a high temperature material.

11. The variable orifice valve of claim 10, wherein a maximum width of the needle end is sized to contact the second side of the first fixed plate at the opening through the first fixed plate to form a seal.

12. The variable orifice valve of claim 1, wherein the needle has a conically shaped end.

13. The variable orifice valve of claim 12, wherein the conically shaped end has a linear taper.

14. The variable orifice valve of claim 12, wherein the conically shaped end has a non-linear taper.

15. The variable orifice valve of claim 1, wherein the actuator ring further comprises knurling on an outside surface thereof.

16. The variable orifice valve of claim 1, wherein the actuator ring has marking indicia on an outside surface or top surface thereof, the marking indicia indicating an amount that the variable orifice valve is open during rotation of the actuator ring.

17. The variable orifice valve of claim 1, wherein there are at least six openings in the movable plate arranged around the needle to allow a fluid to pass through the movable plate.

18. The variable orifice valve of claim 1, further comprising a motor connected to the actuator ring, the motor configured to rotate the actuator ring around a central axis.

19. The variable orifice valve of claim 18, wherein the actuator ring is belt driven by the motor.

20. A variable orifice valve comprising:
a first fixed plate at a first end of the variable orifice valve, the first fixed plate having a first side and a second side defining a first fixed plate thickness, the first fixed plate having an opening extending through the first fixed plate thickness;
a second fixed plate at a second end of the variable orifice valve, the second fixed plate having a first side and a second side defining a second fixed plate thickness, the second fixed plate having an opening extending through the second fixed plate thickness, the first side of the second fixed plate facing and spaced from the second side of the first fixed plate;
a movable plate positioned between the first fixed plate and the second fixed plate, the movable plate having a first side and a second side defining a movable plate thickness, the first side of the movable plate facing the second side of the first fixed plate and the second side of the movable plate facing the first side of the second fixed plate, the movable plate having a needle extending from the first side of the movable plate, the needle having a needle end sized to fit within the opening in the first fixed plate, the movable plate having at least one opening extending through the movable plate thickness adjacent the needle, the needle end having a conical shape with a maximum width sized to contact the second side of the first fixed plate at the opening to form a seal;

a first sealing element between the first fixed plate and the movable plate, the first sealing element comprising a bellows;

a second sealing element between the second fixed plate and the movable plate, the second sealing element comprising a bellows;

an actuator ring adjacent the first fixed plate, the actuator ring having a plurality of inwardly directed engagement elements on an inside surface thereof;

at least three rotary elements within the actuator ring, each of the rotary elements having a plurality of outwardly directed engagement elements on an outside surface thereof, each of the outwardly directed engagement elements configured to cooperatively interact with the inwardly directed engagement elements of the actuator ring;

at least one connector between the first fixed plate and the movable plate, the at least one connector configured to move the movable plate upon rotation of the actuator ring;

a first conduit extending from the first side of the first fixed plate, the first conduit having a threaded end and outwardly facing engagement elements configured to cooperatively interact with the outwardly directed engagement elements of the at least three rotary elements; and a second conduit extending from the second side of the second fixed plate, the second conduit having a threaded end, wherein movement of the actuator ring around a central axis causes each of the rotary elements to rotate around a rotary element axis while remaining in a fixed location relative to the first conduit.

* * * * *